(12) United States Patent
Ryu

(10) Patent No.: US 6,863,300 B2
(45) Date of Patent: Mar. 8, 2005

(54) AUTOMOBILE PILLAR AIR BAG DEVICE

(75) Inventor: Seung-Soo Ryu, Gunpo-Shi (KR)

(73) Assignee: Kia Motors Corporation, Seoul (KR)

( * ) Notice: Subject to any disclaimer, the term of this patent is extended or adjusted under 35 U.S.C. 154(b) by 89 days.

(21) Appl. No.: 10/600,073

(22) Filed: Jun. 20, 2003

(65) Prior Publication Data

US 2004/0094938 A1 May 20, 2004

(30) Foreign Application Priority Data

Nov. 15, 2002 (KR) .................................. 10-2002-0071295

(51) Int. Cl.⁷ .............................................. B60R 21/22
(52) U.S. Cl. .................................. 280/730.2; 280/728.2
(58) Field of Search ........................... 280/728.1, 728.2, 280/728.3, 730.2, 733

(56) References Cited

U.S. PATENT DOCUMENTS

| | | | | |
|---|---|---|---|---|
| 6,079,732 A | * | 6/2000 | Nakajima et al. | ........ 280/728.2 |
| 6,173,990 B1 | * | 1/2001 | Nakajima et al. | ........ 280/730.2 |
| 6,302,434 B2 | * | 10/2001 | Nakajima et al. | ........ 280/730.2 |
| 6,333,515 B1 | * | 12/2001 | Kubota et al. | ........... 280/730.2 |
| 6,485,048 B2 | * | 11/2002 | Tajima et al. | ............ 280/728.2 |
| 6,502,855 B1 | * | 1/2003 | Greiner et al. | ........... 280/730.2 |
| 6,565,117 B2 | * | 5/2003 | Kubota et al. | ........... 280/730.2 |

* cited by examiner

Primary Examiner—Paul N. Dickson
Assistant Examiner—Toan C To
(74) Attorney, Agent, or Firm—Morgan Lewis & Bockius LLP

(57) ABSTRACT

An automobile pillar air bag device provided along the roof side rail protects a passenger from impact during a broadside collision. The automobile pillar air bag device includes: a bag, a sensor, and a gas supply section for injecting gas into an air bag. Further included is a pillar trim deviation-prevention mechanism that includes a strap. Both ends of the strap being connected with the front pillar and the pillar trim by screws. The strap connects the front pillar and an upper portion of the pillar trim. Also, a connection member is bound with the screws. Additionally, the connection member arranged at the front pillar side of the strap is formed integrally with a fixing boss for the front pillar and is coupled to a supporting piece cut out and separated from the fixing boss when the bag is expanded.

7 Claims, 4 Drawing Sheets

AUTOMOBILE PILLAR AIR BAG DEVICE

FIELD OF THE INVENTION

Generally, the present invention relates to a pillar air bag device for an automobile. More particularly, the pillar air bag device is positioned along the roof side rail of an automobile chassis to protect a passenger from impact during a broadside collision.

BACKGROUND OF THE INVENTION

Typically, an air bag is positioned within the chassis of a vehicle such that in a normal state it occupies a small space. Upon activation or deployment, the air bag expands into the passenger compartment to prevent the driver or passenger from impacting components of the vehicle. In the recent years, in order to prevent a driver's or a passenger's head from colliding with the chassis, an air bag device has been installed in a side portion of the interior of the automobile. In such, the bag is accommodated in a space between the front pillar of the chassis and the pillar trim during normal use. During a broadside collision, the air bag expands and pushes the lower portion of the pillar trim away from the pillar of the chassis and is expanded in a curtain shape in the downward direction.

The pillar trim housing a pillar air bag is generally fixed to the front pillar by an insertion member, such as the simple hook. This hook frequently deviates or becomes separated from the pillar during the expansion of the air bag. Following separation, the driver and passengers may be injured by the loose pillar trim.

There thus remains a need in the art for a low cost assembly and efficiently manufactured device for constraining the pillar trim during deployment and expansion of the pillar air bag.

SUMMARY OF THE INVENTION

In an embodiment of the invention a sensor is installed in a chassis for sensing a broadside collision. A gas supply section is installed in the chassis so as to inject a gas depending on a signal from the sensor. An air bag extends from a front pillar of the chassis to a roof side rail, and is expandable in a curtain shape in the downward direction from the roof side rail of the interior of the automobile by gas supplied from the gas supply section. A pillar trim is provided in an inner side of the front pillar and covers the bag received in the front pillar. A pillar trim deviation-prevention mechanism, includes a strap with both ends respectively connected with the front pillar and the pillar trim. Also included are screws for coupling the ends of the strap to the front pillar and pillar trim, respectively.

Preferably, the strap is installed so as to connect the front pillar and an upper portion of the pillar trim. Also, the strap and the screws are connected by a connection member having a coupling hole through which the screw penetrates and a fixing hole into which an end of the strap is inserted and bound. In addition, the connection member, arranged at the front pillar side of the strap, is integrally formed with a fixing boss for the front pillar of the pillar trim and is coupled to a supporting piece that separates from the fixing boss when the bag is expanded.

It is to be understood that both the foregoing general description and the following detailed description of the present invention are exemplary and explanatory and are intended to provide further explanation of the present invention as claimed.

BRIEF DESCRIPTION OF THE DRAWINGS

The above objects and other advantages of the present invention will become more apparent from the detailed description read in conjunction with the figures, in which.

DETAILED DESCRIPTION OF THE INVENTION

Figure 1:
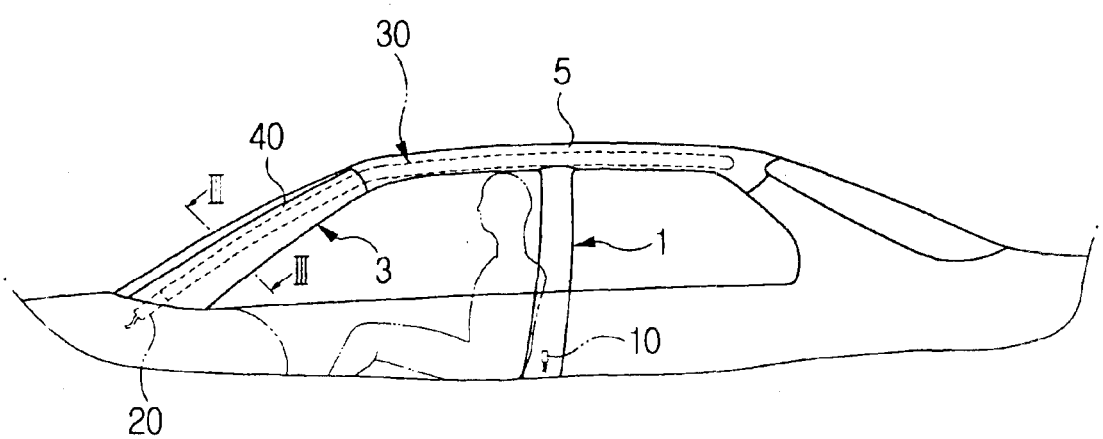
FIG. 1 is a schematic view of a pillar airbag device according to an embodiment of the present invention.

According to FIG. 1, an air bag device according to an embodiment of the present invention includes a broadside collision sensor 10, a gas supply section 20, a bag 30, a pillar trim 40 and a deviation-prevention mechanism 50. Broadside collision sensor 10 is installed, for example, at the lower side of a center pillar 1. Broadside collision sensor 10 is configured to sense a load that exceeds a critical load applied to the side portion of the chassis. The broadside collision sensor 10 can be an acceleration sensor or the like.

Gas supply section 20 is preferably installed at a mid portion of a front pillar 3. Gas supply section 20 is connected to the broadside collision sensor 10 and operates on a signal received from the broadside collision sensor 10. The gas supply section 20 can be a gas storage type device for storing a gas under a high pressure, a gas generating material that generates a gas upon activation, or the like.

Figure 3:
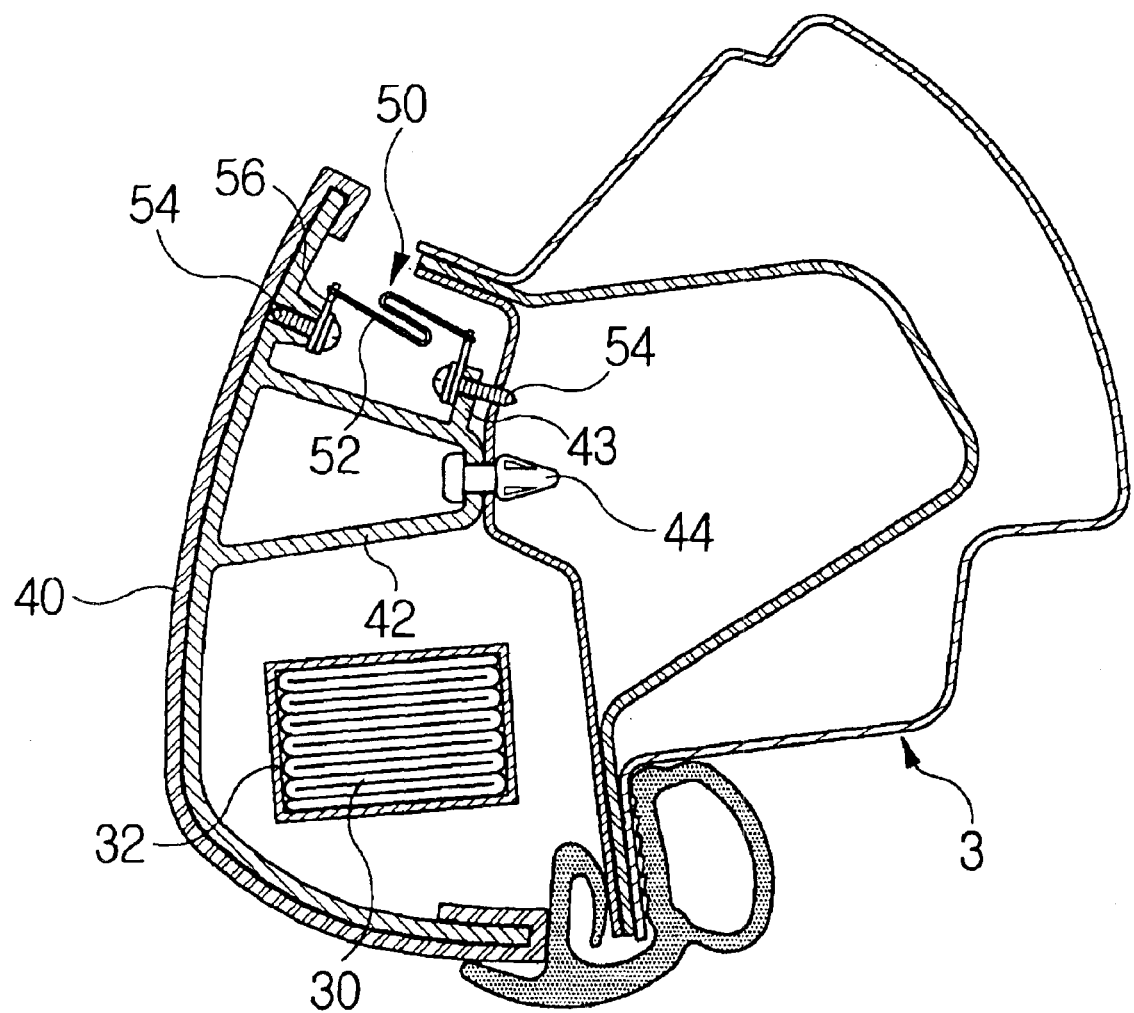
FIG. 3 is a sectional view taken along the line III—III of FIG. 1.
Figure 4:
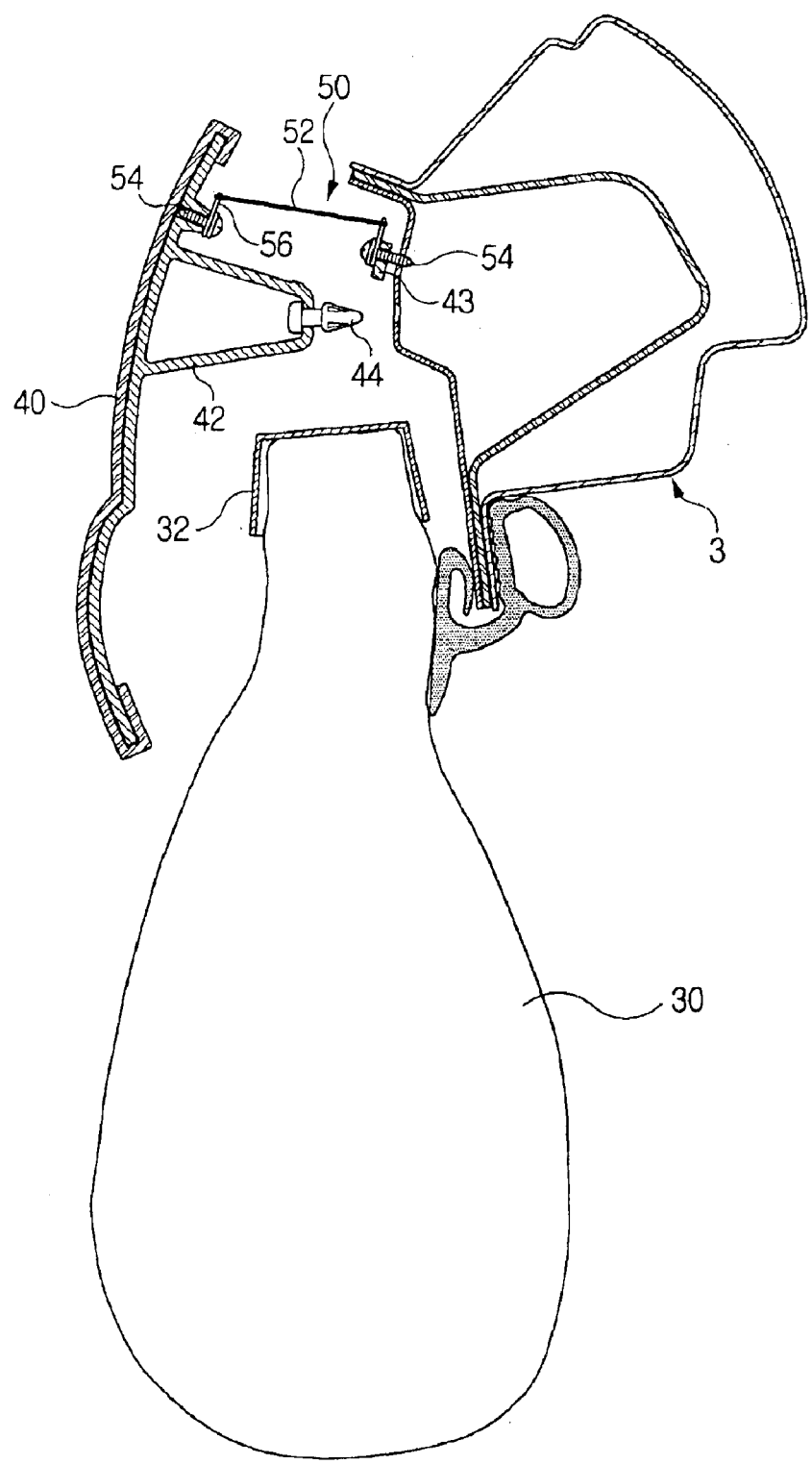
FIG. 4 is a sectional view taken along the line III—III of FIG. 1 showing the air bag expanded.

Bag 30 is arranged along a roof side rail 5. Bag 30 is connected with the gas supply section 20 and is expanded by a gas supplied from the gas supply section 20 upon activation. The bag 30 is normally folded and accommodated in a case 32 (FIG. 3). After activation, when the bag 30 is expanded, case 32 is broken by the expansive force of the bag 30 and the bag 30 is unfolded (FIG. 4).

Pillar trim 40 constitutes interior materials of the chassis and accommodates the gas supply section 20 and the bag 30. Pillar trim 40 completely encloses the gas supply section 20 and the bag 30 such that they are not exposed. Pillar trim 40 is fixed to the pillar 3 by a fixing pin 44. Fixing pin 44 is fixed to a boss 42 that protrudes toward and contacts pillar 3, such that the fixing pin 44 can be inserted into a fixing hole formed in the pillar 3.

Deviation-prevention mechanism 50 includes a strap 52, a pair of screws 54, and a pair of connection members 56. The components of the deviation-prevention mechanism connects the pillar 3 with the pillar trim 40. Each end of the straps are respectively coupled to one sided holes of the connection members 56. The pillar 3 and the pillar trim 40 are connected by screws 54. Screws 54 penetrate through holes in each of the connection members 56. One screw 54 couples a connection member 56 with the pillar trim 40. Another screw 54 couples the pillar trim 40 to the pillar 3. Furthermore, a fixing pin 44 couples the pillar trim 40 with the pillar 3. Therefore, the deviation-prevention mechanism 50 connects the pillar 3 with the pillar trim 40. Accordingly, the length of strap 52 is longer that the length of the boss 42, such that the pillar trim 40 can be displaced from the pillar 3 a specified distance before the strap 52 becomes taught.

The connection member 56, near the pillar 3, is supported by a supporting piece 43. The support piece 43 is integrally formed with the boss 42 and coupled to the pillar 3 by the screw 54. The supporting piece 43 is constructed such that the connecting portion of the support piece 43 that connects with the boss 42 breaks when a force is applied, the force being less than the force generated by a deploying air bag. Thus, the supporting piece 43 is separated from the boss 42 during the expansion of the bag 30.

Figure 2:
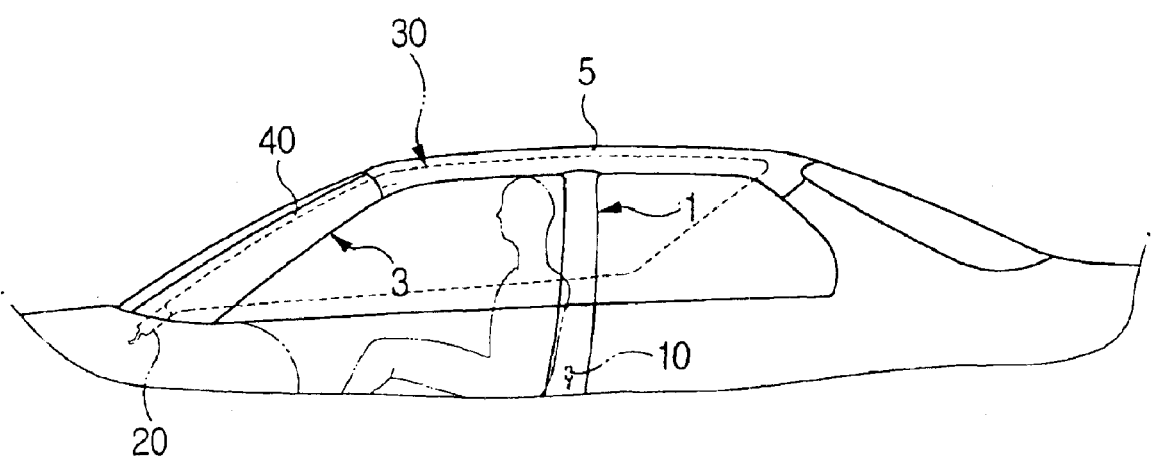
FIG. 2 is a schematic view showing the pillar airbag device of FIG. 1 following expansion of the air bag.

In a preferred embodiment, the bag 30 is folded in the case 32 within a space between the pillar 3 and the pillar trim 40. The pillar trim 40 is fixed to the pillar 3 by the fixing pin 44 and the deviation-prevention mechanism 50. During normal use, the strap 52 is maintained in a loosely extended state. During a broadside collision, a signal from the broadside collision sensor 10 triggers the gas supply section 20 to supply gas to the bag 30. Accordingly, as shown in FIGS. 2 and 4, the bag 30 is expanded downwardly in a curtain shape. At this time, as shown in FIG. 4, during expansion, the bag 30 expands and pushes the lower portion of the pillar trim 40 outwardly away from the pillar 3. The fixing pin 44 that fixes the pillar trim 40 to the pillar 3 is separated from the fixing hole of the pillar 3 by the expansive force of the bag 30, so that the pillar trim 40 is separated from the pillar 3. The supporting piece 43 is broken and separated from the boss 42 allowing the pillar trim 40 to separate from the pillar 3. However, since the pillar trim 40 and the pillar 3 are connected by the deviation-prevention mechanism 50, the pillar trim 40 is separated from the pillar 3 only a predetermined distance and does not completely deviate from the pillar 3.

While the present invention has been described in detail, it should be understood that various changes, substitutions and alterations could be made hereto without departing from the spirit and scope of the invention as defined by the appended claims.

What is claimed is:

1. An automobile pillar airbag device, comprising:
   a sensor installed in a chassis, for sensing a broadside collision;
   a gas supply section installed in the chassis so as to inject a gas depending on a signal from the sensor;
   a bag received and extending from a front pillar of the chassis to a roof side rail, and expanded in a curtain shape in the downward direction from the roof side rail of the interior of the automobile by a gas supplied from the gas supply section following a signal to said gas supply section from said sensor;
   a pillar trim provided in an inner side of the front pillar and covering the bag received in the front pillar; and
   a pillar trim deviation-prevention mechanism comprising:
   a strap having ends connected with the front pillar and the pillar trim, respectively, and
   screws for coupling each end of said strap to the front pillar and said pillar trim respectively.

2. The automobile pillar airbag device according to claim 1, wherein the strap is installed so as to connect the front pillar and an upper portion of the pillar trim.

3. The automobile pillar airbag device according to claim 1 or 2, wherein the strap and the screws are connected by connection members through which the screws penetrate, and wherein the connection members define fixing holes to which ends of the strap are inserted and bound.

4. The automobile pillar airbag device according to claim 3, wherein the connection member, arranged at the front pillar side of the strap, is formed integrally with a fixing boss for the front pillar of the pillar trim and is coupled to a supporting piece broken and separated from the fixing boss when the bag is expanded.

5. A pillar air bag device, comprising:
   a front pillar housing an air bag gas supply;
   a side trim coupling to an interior side of said front pillar;
   a curtain air bag housed between said side trim and said front pillar wherein said curtain air bag is configured to be deployed by the air bag gas supply housed within said front pillar;
   at least one fixation protrusion extending from said side trim and coupled to said front pillar wherein said fixation protrusion is configured to break when a force is applied by the curtain air bag during deployment of the air bag such that an opening is created between said side trim and said front pillar for protrusion of the air bag; and
   a strap coupling said side trim to said front pillar.

6. The device of claim 5, further comprising a temporary fixation coupling said side trim to said front pillar.

7. The device of claim 5, wherein said strap engages during deployment of said curtain air bag such that said side trim becomes controllably displaced during deployment of said curtain air bag.

* * * * *